US011288542B1

(12) United States Patent
Samplawski et al.

(10) Patent No.: US 11,288,542 B1
(45) Date of Patent: Mar. 29, 2022

(54) LEARNING GRAPH-BASED PRIORS FOR GENERALIZED ZERO-SHOT LEARNING

(71) Applicant: SAP SE, Walldorf (DE)

(72) Inventors: Colin Samplawski, Holmen, WI (US); Jannik Wolff, Berlin (DE); Tassilo Klein, Berlin (DE); Moin Nabi, Berlin (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/950,730

(22) Filed: Nov. 17, 2020

(51) Int. Cl.
 *G06K 9/62* (2022.01)
 *G06N 3/04* (2006.01)
 *G06N 3/08* (2006.01)
 *G06V 10/40* (2022.01)

(52) U.S. Cl.
 CPC ........... *G06K 9/6256* (2013.01); *G06K 9/627* (2013.01); *G06N 3/04* (2013.01); *G06N 3/08* (2013.01); *G06V 10/40* (2022.01)

(58) Field of Classification Search
 None
 See application file for complete search history.

(56) References Cited

U.S. PATENT DOCUMENTS

2020/0020098 A1* 1/2020 Odry ..................... G06K 9/6245
2021/0358577 A1* 11/2021 Zhang ..................... G16H 10/20

* cited by examiner

*Primary Examiner* — Leon Flores
(74) *Attorney, Agent, or Firm* — Erise IP, P.A.

(57) ABSTRACT

An image is received for classification. Thereafter, features are extracted from the image which are used by a machine learning model to classify the image. Thereafter, data is provided that characterizes the classification. The machine learning model can be trained using a training data set labeled, in part, using a generative model conditioned on label attribute information in combination with a directed relation graph having a plurality of nodes in which each node without images at training time are given predefined probability distributions. Related apparatus, systems, techniques and articles are also described.

20 Claims, 4 Drawing Sheets

LEARNING GRAPH-BASED PRIORS FOR GENERALIZED ZERO-SHOT LEARNING

TECHNICAL FIELD

The subject matter described herein relates to the use of relation graphs over labels as an additional source of side information for generalized zero-shot learning.

BACKGROUND

Deep learning models are increasingly being used across diverse applications. As one example, computer vision using deep learning has been demonstrated to achieve performance levels that are better than humans for many tasks. However, deep learning models still require a large amount of labeled training data in order to achieve such performance. The process of labeling such data can be not only time consuming, but can consume considerable computing resources.

SUMMARY

In one aspect, an image is received for classification. Thereafter, features are extracted from the image which are used by a machine learning model to classify the image. Thereafter, data is provided that characterizes the classification. The machine learning model can be trained using a training data set labeled, in part, using a generative model conditioned on label attribute information in combination with a directed relation graph having a plurality of nodes in which each node without images at training time are given predefined probability distributions.

The machine learning model can take various forms including one or more of: a logistic regression model, a support vector machine, a neural network, or a decision tree.

The generative model can take various forms including a variational autoencoder (VAE). The VAE can be a cross-alignment and distribution-alignment VAE (CADA-VAE). The predefined probability distributions can be Gaussian distributions. An attribute encoder can encode attributes from unseen classes during training.

The providing of data characterizing the classification can include one or more of: causing the classification to be displayed in a graphical user interface of an electronic visual display, transmitting the classification over a network to a remote computing system, storing the classification in physical persistence, or loading the classification into memory.

In interrelated aspect, training data is labeled using a generative model conditioned on label attribute information in combination with a directed relation graph having a plurality of nodes in which each node without images at training time has predefined probability distributions. Thereafter, a machine learning model is trained using the training data. The machine learning model once deployed, can receive an image for classification. Features are extracted from the image so that the machine learning model can classify the image.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides improved classification results as compared to other approaches to generalized zero-shot learning techniques.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
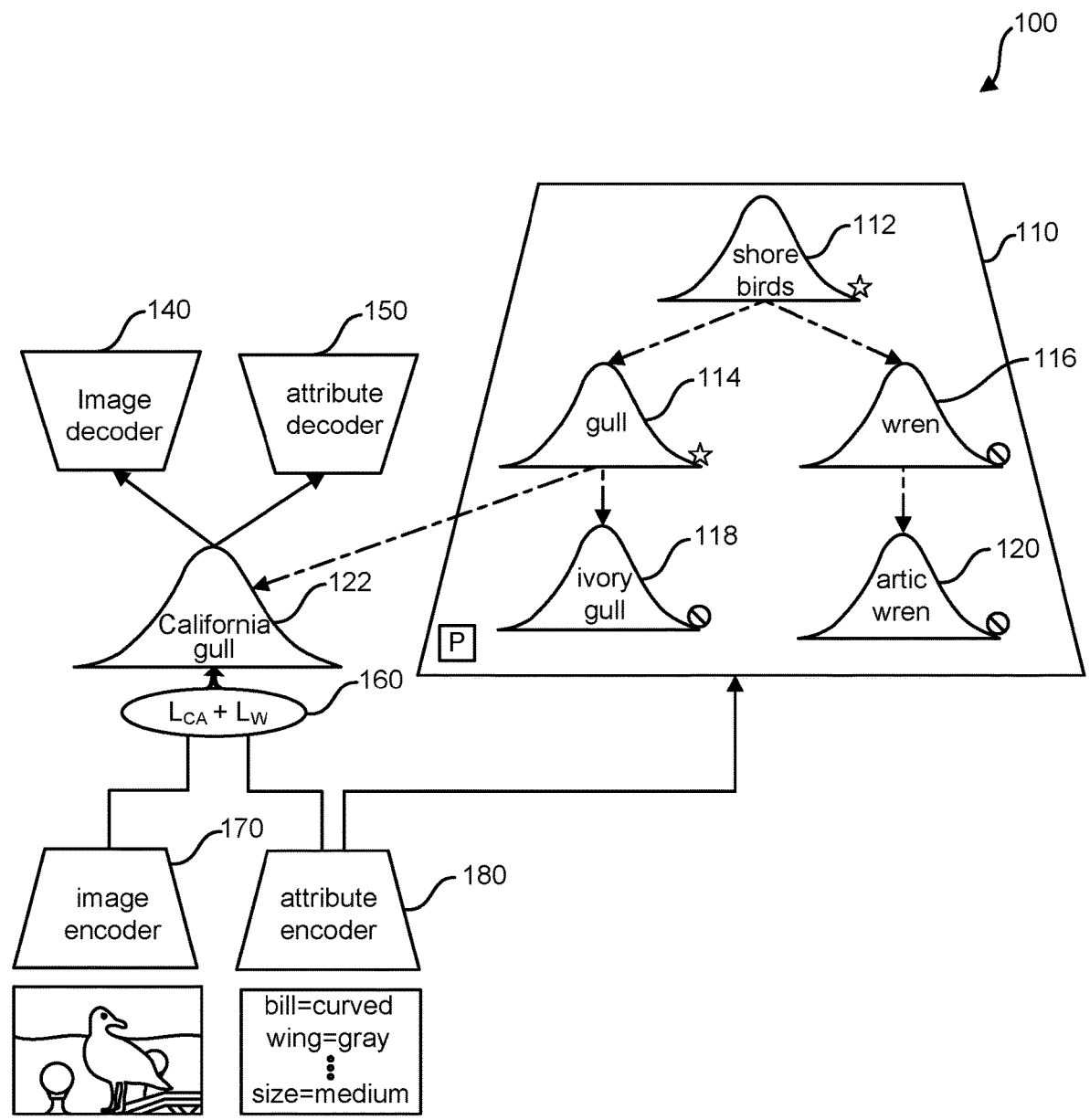
FIG. 1 is a diagram illustrating learning graph-based priors for generalized zero-shot learning for the CUB dataset.

The task of zero-shot learning (ZSL) requires correctly predicting the label of samples from classes which were unseen at training time. This can be achieved by leveraging side information about class labels, such as label attributes or word embeddings. Generalized ZSL (GZSL) is a variation in which test sets consist of seen and unseen samples. GZSL can utilize generative models to generate samples from unseen classes. With the current subject matter, an additional source of side information in the form of a relation graph over labels can be incorporated. This graph can be leveraged in order to learn a set of prior distributions, which, in turn, can encourage an aligned variational autoencoder (VAE) model to learn embeddings which respect the graph structure. This approach was shown to provide improved performance on the Caltech-USCD birds 200 (CUB) and Scene UNderstading (SUN) benchmarks over a strong baseline.

The performance of a ZSL model is naturally very dependent upon on the quality of side information used to train it. Conventional approaches have shown that leveraging additional side information in the form of a graph over labels can lead to significant gains in zero-shot learning performance.

By conditioning a generative model (such as a generative adversarial network (GAN) or a variational autoencoder (VAE)) on the label attributes, synthetic samples from unseen classes can be generated to help compensate for the missing data. As will be described in more detail below, the graph structure in a generative model, namely a VAE-based one is being used with ZSL. A Gaussian distribution can be learned for each node in the graph to act a set of priors for the VAE models. A loss can be simultaneously optimized which encourages node embeddings to respect the graph structure while the VAE models are trained. This arrangement leads to a shared latent space which respects the graph structure. Experiments have demonstrated that this approach leads to improved performance on several GZSL benchmarks over a strong baseline.

With, GZSL, there are a set of seen classes, $y^S$, and unseen classes, $y^U$. For all classes $y^S \cup y^U$ there can be access to side information usually in the form of label attribute vectors, $\mathcal{A} = \{a_c | c \in y^S \cup y^U\}$. In addition, there can be access to a dataset $\mathcal{D} = \{(x,y) | \in |X, y \in y^S\}$ of training samples from the seen classes, where X is the image feature space (such as the final hidden layer of a deep convolutional neural network (CNN) model). Using $\mathcal{D}$ and $\mathcal{A}$, the goal of the learner is then to learn a classification function $f: X \rightarrow y^S \cup y^U$.

The current subject matter expands GZSL by adding an additional source of side information in the form a directed relation graph G. This graph has nodes corresponding to $y^S$ and $y^U$ together with an additional set of nodes $y^I$ for which no images exist (neither at training nor test time). Nodes in G further have at least an associated attribute vector. Finally, an edge in G indicates that there is a relation between two nodes. An example of such a graph is a tree-structured label hierarchy where edges indicate "is-a" relations between classes, and $y^I$ is the set of superclasses of $y^S \cup y^U$, which are assumed to be leaves. The current approach does not require a hierarchy, but rather can be applied to any DAG over labels.

A variational autoencoder aims to learn the conditional distribution $p_\theta(z|x)$ for each data sample x and latent factors z. As the latent factors are generally not known, this distribution can be estimated via the parameterized distribution $q_\phi(z|x)$. This is accomplished by maximizing the evidence lower-bound (ELBO):

$$\mathbb{E}_{q_\phi(z|x)}[\log p_\theta(x|z)] - D_{KL}(q_\phi(z|x) \| p_\theta(z)) \quad (1)$$

The first term is the loss of reconstructing x from the predicted latent factors z using the decoder $p_\theta(x|z)$. The second terms minimizes the KL divergence between the encoder $q_\phi(z|x)$ and a prior $p_\theta(x|z)$, which acts as a regularizer.

The Cross- and Distribution Aligned (CADA) VAE model consists of a VAE for each modality of the data (i.e. images and attributes). Consider the case for a pair of modalities i and j. Let $Q^i$ and $D^i$ be the encoder and decoder for modality i, respectively. They use LI reconstruction loss as a surrogate for $\log p_\theta(x|z)$ and the standard normal distribution as a prior. So, for each VAE we have the following loss:

$$L_{VAE}^i = |x^i - D^i(Q^i(x^i))| - \alpha D_{KL}(Q^i(x^i) \| \mathcal{N}(0,I)) \quad (2)$$

where $x^i$ is a training sample from modality i. They then seek to align the latent spaces of the VAEs using a cross-alignment loss where each decoder must successively decode the generated latent samples for each other modality. The cross-alignment loss is then:

$$L_{CA} = |x^i - D^i(Q^j(x^j))| + |x^j - D^j(Q^i(x^i))| \quad (3)$$

where $x^i$ and $x^j$ are samples from each modality with the same class. They further enforce alignment by adding a Wasserstein distance penalty between each pair of encoded distributions from different modalities but with the same class.

$$L_W = W_2(Q^i(x^i), Q^j(x^j)) \quad (4)$$

Since both distributions are multivariate Gaussians, this can be computed efficiently in closed form. The full CADA-VAE loss is then:

$$L_{CADAVAE} = L_{VAE}^i + L_{VAE}^j + \beta L_{CA} + \gamma L_W \quad (5)$$

TABLE 1

| Dataset | $|a_c|$ | $|y^S|$ | $|y^U|$ | $|G|$ | $|D_{tr}|$ | $|D_{ts}|$ |
|---|---|---|---|---|---|---|
| CUB | 312 | 150 | 50 | 200 + 182 | 7057 | 2967 + 1764 |
| SUN | 102 | 645 | 72 | 717 + 16 | 10320 | 1440 + 2580 |

Table 1: Dataset statistics. $|a_c|$ denotes the dimensionality of the attribute vectors for each dataset. $|G|$ denotes the number of nodes which have images plus the number of nodes which do not. $|D_{tr}|$ denotes the number of training instances. Similarly, $|D_{ts}|$ gives the number of unseen test samples plus the number of seen test samples.

Given a relation graph, is it often useful to learn a representation for each node. This learning can be achieved by minimizing some distance between nodes which have a relation (the positive samples) and maximizing the distance between nodes which do not have a relation (the negative samples). For example, it has been shown that this can be effectively done when embedding each concept as a multivariate Gaussian distribution. An energy based max-margin ranking objective for margin m can be given by:

$$L_m(w, c_p, c_n) = \max(0, m - E(w, c_p) + E(w, c_n)) \quad (6)$$

Here w is the embeddings of the main "word" and $c_p$ and $c_n$ are positive and negative context words, respectively. In the case of the relation graphs, w corresponds to a node in the graph and $c_p/c_n$ are embeddings of other nodes which do/do not have a relation with w. The energy function E computes how similar a pair of embeddings are. Relations are often asymmetric, an asymmetric metric can be used for the energy function, namely the negative Kullback-Leibler divergence:

$$E(x,y) = -D_{KL}(x \| y) \quad (7)$$

Such embeddings can be used for entailment, link prediction, and node classification tasks.

The current subject matter unifies aligned VAEs of CADA-VAE together with the Gaussian embeddings approach as provided in FIG. 1. FIG. 1 is a diagram 100 using a simplified graph 110 for the CUB dataset. Each node in the graph is embedded as a Gaussian distribution, with dashed lines representing "isa" relations. The California gull class 122 has images at training time (i.e. it is in $y^S$). Nodes 118, 120 have no images at training time, but do at test time ($y^U$). Nodes 112, 114, 116 are superclasses which have no associated images at any time ($y^I$). Region 110 is the set of distributions P which make up the prior. For this example, nodes 112, 114 marked with * are positive samples for California gull and nodes 116, 118, 2120 marked with Ø are negative samples.

Referring again to FIG. 1, an image encoder 170 can be a neural network which maps the image pixels (e.g., pixels of the gull picture) into the latent space of the VAE. An attribute encoder 180 can be a neural network that maps attribute vectors for the image into the latent space of the VAE. Element 160 is a representation of the alignment loss ideas described further herein in connection with Equations 3 and 4. An image decoder 140 can be a neural network that maps the latent samples from the latent space of the VAE back to the image space. Similarly, an attribute decoder 150 can be a neural network that maps the latent samples from the latent space of the VAE back to the attribute vectors. The encoders and decoders are denoted as Q and D herein.

Rather than using a single global prior when training the VAEs, a Gaussian distribution can be used for each node in G which has no images available at training time to act as priors for the seen classes. A similar ranking objective can then be used to push the seen class distributions of both modalities to a location which respects the graph structure as encoded by the priors. Let $P=\{\mathcal{N}_c | c \notin y^S\}$ be the set of Gaussian distributions that make up the prior. The VAE loss can be replaced with the following term:

$$\hat{L}_{VAE}^i = |x^i - D^i(Q^i(x^i))| + \alpha[L^m(Q^i(x^i), c_p, c_n)) - D_{KL}(Q^i(x^i) \| \mathcal{N}(0,I))] \quad (8)$$

where $c_p \in P$ is a Gaussian distribution for a node which has a relation with the class of $x^i$. Likewise $c_n \in P$ is a Gaussian distribution for a node which does not a relation. N(0, I) prior can be included; however, here, it can be characterized as a kind of root node in the graph with which all nodes have a relation.

In order to obtain the set P, embeddings can be pretrained ahead of time and kept fixed while training the VAEs. An end-to-end approach can be implemented in which the distributions making up the prior are learned together with the VAE. The parameters for the distributions in P can be predicted using an attribute encoder 180. That is, for each $c_i \in P$, there is $c_i = Q^A(a_i)$. An additional loss can be added to the objective which encourages the distributions in P to encode the graph structure. For a distribution $c_i \in P$, there is:

$$L_{prior} = L_m(c_i, c_p, c_n) - D_{KL}(c_i \| \mathcal{N}(0,I)) \quad (9)$$

where again $c_p/c_n$ are nodes with positive/negative relations with $c_i$. So our total objective is then:

$$L_{ours} = \hat{L}_{VAE}^i + \hat{L}_{VAE}^j + \beta L_{CA} + \gamma L_W + \epsilon L_{prior} \quad (10)$$

Two GZSL benchmarks can be used, the Caltech-UCSD Birds dataset (CUB) and the SUN with attributes dataset (SUN) (Table 1). The pretrained ResNet101 features can be used. For CUB, a class hierarchy can be used which provides a tree of "is-a" relations over the species in CUB which is derived from the Wikispecies dataset. The SUN dataset includes a "is-a" graph over classes, however, it is a not a hierarchy, with some nodes having multiple parents. Both graphs contain nodes which have no associated attributes. These nodes' attributes can be set to be the mean of the attributes of all nodes which are reachable from that node.

Aside from including the graph structure, the current approach adds one additional change compared to CADA-VAE. Namely, the attribute encoder is used to encode attributes from unseen classes during training. This arrangement can improve performance on its own, and so the results are presented using two graphs. First, a flat, uninformative graph can be used in which all nodes have a positive relation only with a root node. The ranking objective then only encourages the distributions for each class to be far away from each with respect to the KL divergence. Second, results can be provided using the full graph for each dataset.

Table 2 illustrates experimental results in which U and S denote the average top-1 per class accuracy for the seen and unseen classes, respectively. H is the harmonic mean between these two values. The results for CADA-VAE are from the original paper to Schönfeld et al.

Various hyperparameters can be used CADA-VAE. The encoders predict a 64-dimensional multivariate Gaussian with diagonal covariance. The image encoder 170 can be a one layer MLP with 1560 hidden units. The image decoder 140 was a one layer MLP with 1660 hidden units. Similarly, the attribute encoder 180 was a one layer MLP with 1450 units and the attribute decoder 150 has 660 hidden units. The VAE models were trained for 100 epochs using Adam with a learning rate of 0.00015 and a batch size of 50. The loss weight scales were set with an annealing scheme where all scaled losses started with 0 weight and are then increased linearly for a set number of epochs. The scale on the KL divergence term ($\alpha$) increased by 0.003 for each epoch in (0, 93]. The scale on the cross-alignment loss ($\beta$) was increased by 0.045 for each epoch in (6, 75], and the weight scale on the Wasserstein distance term ($\gamma$) was increased by 0.55 for each epoch in (6, 22]. These hyperparameters were kept fixed and the only new hyperparameters we introduced were similar weighting parameters for the prior loss ($\epsilon$). These values were tuned separately for each dataset via random search using the provided validation split. On both datasets $\epsilon$ is increased in epochs (0,49]. The value is increased by 0.0717 for CUB and 0.02271 on SUN. The margin m in the $L_m$ loss was set to 1.

The final classifier was a logistic regression model also trained with Adam for 20 epochs with a learning rate of 1e-3 and batch size of 32. The dataset for the classifier was generated using the encoders of the VAE models. For the seen classes, 200 samples were drawn for each class using random training images as input to the encoder. For the un-seen classes 400 samples were drawn from each distribution predicted for each attribute vector.

The positive and negative context pairs for each node were generated using the full transitive closure of the graph. That is, two nodes have a relation if there exists a path between those two nodes as shown in diagram 100 of FIG. 1. At each training step, in addition the batch of image/attribute pairs from seen classes, a batch of the same size can be sampled from nodes in P in order to optimize $L_{prior}$.

Figure 2:
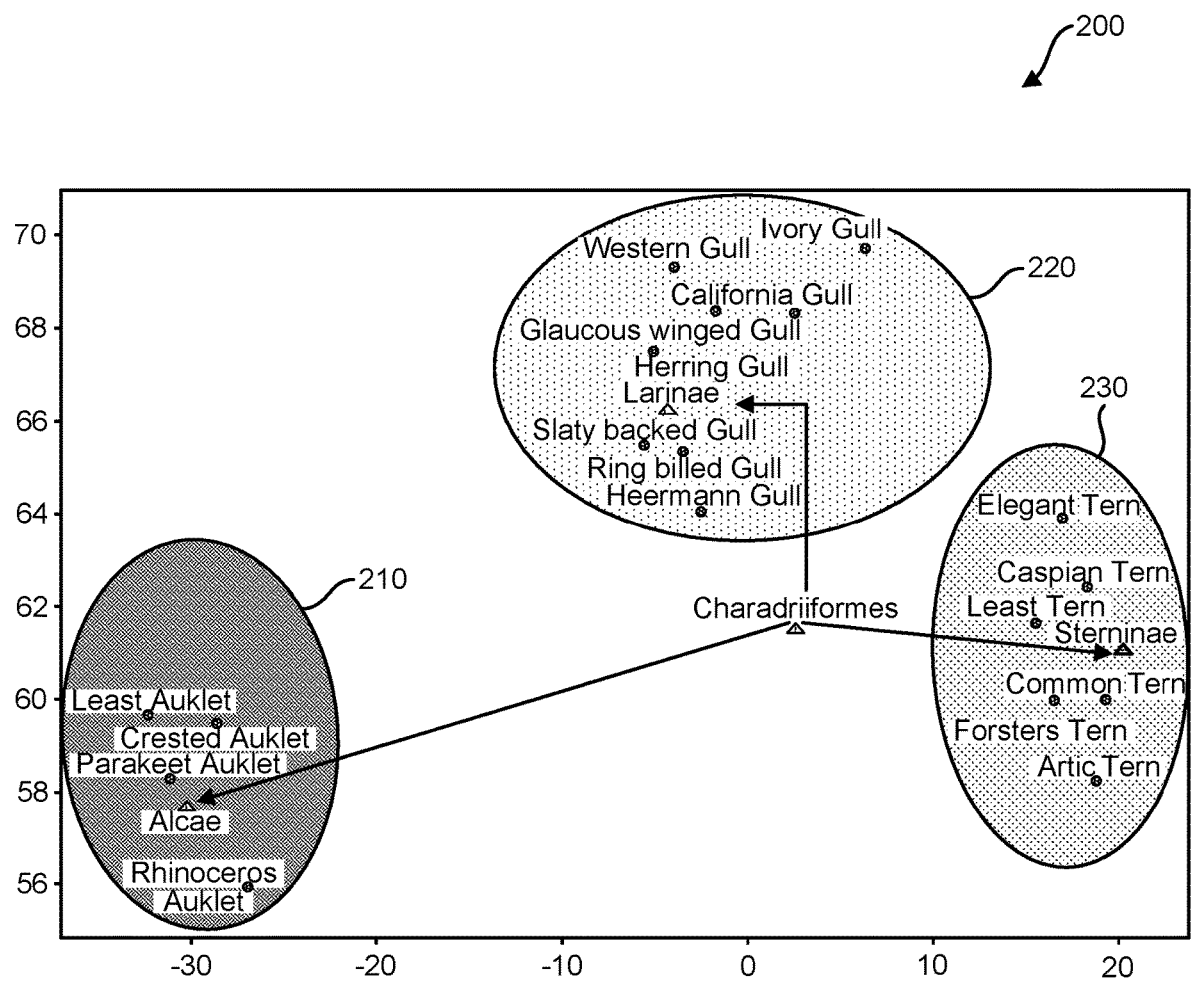
FIG. 2 is a diagram illustrating a subgraph of the CUB graph.

Qualitative results can be presented in the form of a 2D TSNE projection of the learned latent space on the CUB dataset as shown in diagram 200 of FIG. 2. In particular, FIG. 2 is a TSNE projection of the learned means from the attribute encoder 180. The circular nodes indicate leaf nodes. The triangular nodes indicate superclasses. We display a simplified subgraph of the full CUB graph rooted at the "Charadriiformes" (shore birds) node 240. It is split into three subcategories: gulls 210, wrens 220, and auklets 230, as indicated by the ovals. In particular, the projection of the mean of the predicted distribution can be plotted for each attribute. The latent space can be made up of three subgroups 210, 220, 230 which fall under the "Charadri-iformes" superclass, also known as "shore birds". It can be seen that the model has learned to group the fine-grained leaf classes together with the embedding of the supercategory placed roughly equidistant from them. A similar phenomenon can be seen at a higher semantic level where the ancestor of all these nodes is situated roughly in the middle of the three categories.

The main quantitative results of the experiments are shown in Table 2. Table 2 illustrates that a simple flat graph does results in gains in performance over CADA-VAE, most

TABLE 2

| Model | Graph | CUB | | | SUN | | |
|---|---|---|---|---|---|---|---|
| | | U | S | H | U | S | H |
| CADA-VAE | — | 51.6 | 53.5 | 52.4 | 47.2 | 35.7 | 40.6 |
| Ours | Flat | 47.8 | 59.0 | 52.8 | 44.0 | 38.3 | 40.9 |
| Ours | Full | 51.4 | 58.3 | 54.6 | 45.0 | 38.0 | 41.2 | likely to do the fact that the unseen class attributes are used to help train the attribute encoder. However, a further increase in performance when using the full graph on both datasets. The strongest gains were seen on the CUB dataset. This may be due to the fact that the CUB graph is a tree, whereas the graph over SUN is a DAG, which is likely more difficult to encode. Furthermore, the graph provided for CUB is much denser, with 182 internal nodes defining the supercategory structure of the labels. By contrast, the SUN graph adds only 16 additional higher level nodes.

TABLE 3

| Model | $L_{CA}$ | $L_{DA}$ | CUB | | |
|---|---|---|---|---|---|
| | | | U | S | H |
| CADA-VAE | X | X | 0.13 | 67.1 | 0.27 |
| | ✓ | X | 48.1 | 52.6 | 50.2 |
| | X | ✓ | 43.8 | 48.1 | 45.8 |
| | ✓ | ✓ | 51.6 | 53.5 | 52.4 |
| Ours | X | X | 9.88 | 60.8 | 17.0 |
| | ✓ | X | 13.6 | 69.3 | 22.8 |
| | X | ✓ | 39.3 | 40.8 | 40.1 |
| | ✓ | ✓ | 51.4 | 58.3 | 54.6 |

Finally, an ablation study is provided over the alignment loss functions used herein (Table 3). In particular, a comparison against CADA-VAE in three scenarios is provided using the CUB dataset. First, removing the $L_{CA}$ loss from the objective can be considered followed by removing the $L_{DA}$ loss, and finally removing both. It can be seen that CADA-VAE is more robust to turning off loss terms compared to the current approach. In particular, the success of the current prior seems very dependent on also including the cross-alignment loss. When both alignment losses are turned off, the CADA-VAE is unable to maintain performance, achieving a nearly zero harmonic mean. This is unsurprising, because without enforcing any alignment at all, it is nearly impossible to generalize to the unseen classes. However, under the same setting the current approach is still able to maintain some performance with respect to harmonic mean. This suggests that the prior itself can provide an implicit alignment of the two VAEs by encouraging both of them to respect the graph structure in the same way.

The current subject matter is advantageous in that it provides a straightforward way to incorporate the structure of a graph over labels in a generative model for GZSL. This can be accomplished by learning a Gaussian embedding for each node in the graph to act as a prior for an aligned VAE model. By training the distributions that make up this prior end-to-end with the VAE models, improved performance can be achieved on several GZSL benchmarks over a strong baseline.

Figure 3:
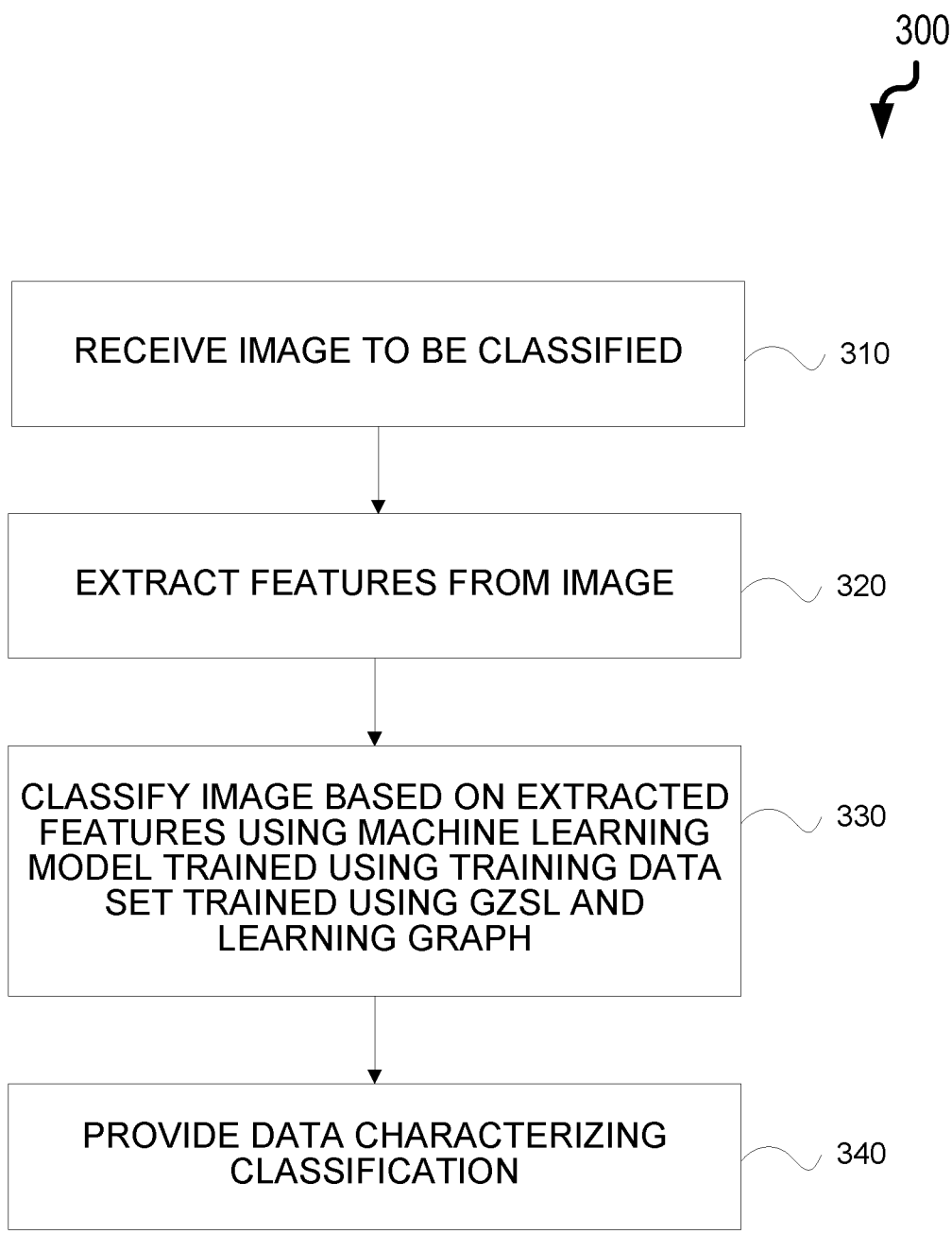
FIG. 3 is a process flow diagram illustrating classification using of a model trained using learning graph-based priors for generalized zero-shot learning.

FIG. 3 is a diagram 300 illustrating in which, at 110, an image is received for classification. Thereafter, at 320, features are extracted from the image so that, at 330, the image can be classified by a machine learning model. The machine learning model can be trained using a training data set labeled, in part, using a generative model conditioned on label attribute information in combination with a directed relation graph having a plurality of nodes in which each node without images at training time have predefined probability distributions. Thereafter, at 340, data is provided (e.g., displayed, loaded into memory, stored in physical persistence, transmitted over a network to a remote computing system, etc.).

Figure 4:
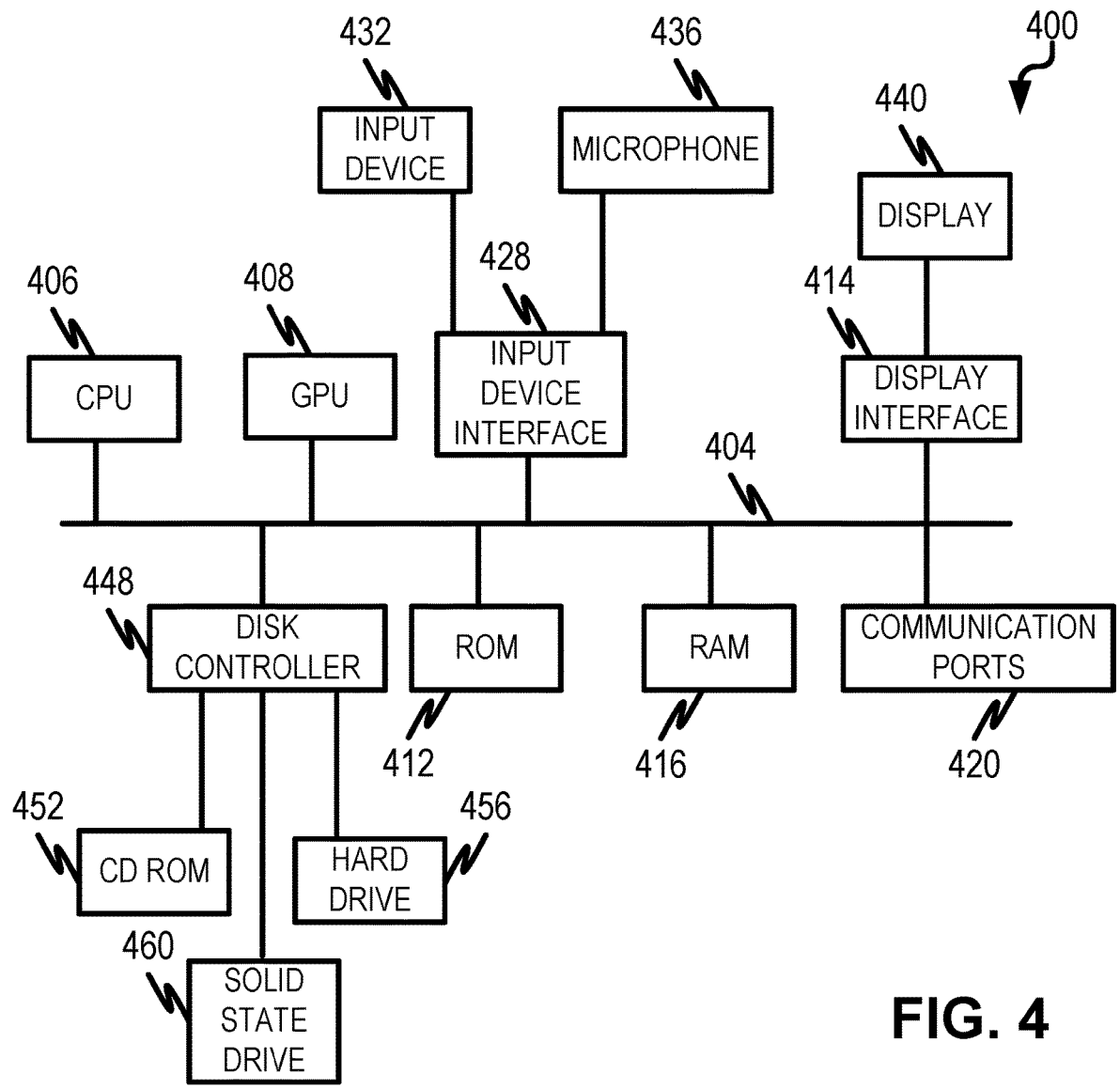
FIG. 4 is a diagram of a computing device for implementing the current subject matter.

FIG. 4 is a diagram 400 illustrating a sample computing device architecture for implementing various aspects described herein. A bus 404 can serve as the information highway interconnecting the other illustrated components of the hardware. A processing system 406 labeled CPU (central processing unit) (e.g., one or more computer processors/data processors at a given computer or at multiple computers) and/or a processing system 408 labeled GPU (graphical processing unit) can perform calculations and logic operations required to execute a program. A non-transitory processor-readable storage medium, such as read only memory (ROM) 412 and random access memory (RAM) 416, can be in communication with the processing systems 406, 408 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 448 can interface with one or more optional disk drives to the system bus 404. These disk drives can be external or internal solid state drives such as 460, external or internal CD-ROM, CD-R, CD-RW or DVD, or external or internal hard drives 456. As indicated previously, these various disk drives 452, 456, 460 and disk controllers are optional devices. The system bus 404 can also include at least one communication port 420 to allow for communication with external devices either physically connected to the computing system or available externally through a wired or wireless network. In some cases, the at least one communication port 420 includes or otherwise comprises a network interface.

To provide for interaction with a user, the subject matter described herein can be implemented on a computing device having a display device 440 (e.g., a CRT (cathode ray tube) or LCD (liquid crystal display) monitor) for displaying information obtained from the bus 404 via a display interface 414 to the user and an input device 432 such as keyboard and/or a pointing device (e.g., a mouse or a trackball) and/or a touchscreen by which the user can provide input to the computer. Other kinds of input devices 432 can be used to provide for interaction with a user as well; for example, feedback provided to the user can be any form of sensory feedback (e.g., visual feedback, auditory feedback by way of a microphone 436, or tactile feedback); and input from the user can be received in any form, including acoustic, speech, or tactile input. The input device 432 and the microphone 436 can be coupled to and convey information via the bus 404 by way of an input device interface 428. Other computing devices, such as dedicated servers, can omit one or more of the display 440 and display interface 414, the input device 432, the microphone 436, and input device interface 428.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network.

The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for implementation by one or more computing devices comprising:
   receiving an image for classification;
   extracting features from the image;
   classifying, using the extracted features by a machine learning model, the image; and
   providing data characterizing the classification;
   wherein the machine learning model is trained using a training data set labeled, in part, using a generative model conditioned on label attribute information in combination with a directed relation graph having a plurality of nodes in which each node without images at training time has predefined probability distributions.

2. The method of claim 1, wherein the machine learning model is a logistic regression model, a support vector machine, a neural network, or a decision tree.

3. The method of claim 1, wherein the generative model is a variational autoencoder (VAE).

4. The method of claim 3, wherein the VAE is a cross-alignment and distribution-alignment VAE (CADA-VAE).

5. The method of claim 4, wherein the predefined probability distributions are Gaussian distributions.

6. The method of claim 5, wherein an attribute encoder encodes attributes from unseen classes during training.

7. The method of claim 1, wherein providing the data characterizing the classification comprises: causing the classification to be displayed in a graphical user interface of an electronic visual display, transmitting the classification over a network to a remote computing system, storing the classification in physical persistence, or loading the classification into memory.

8. A system comprising:
   at least one data processor; and
   memory storing instructions which, when executed by the at least one data processor, result in operations comprising:
   receiving an image for classification;
   extracting features from the image;
   classifying, using the extracted features by a machine learning model, the image; and
   providing data characterizing the classification;
   wherein the machine learning model is trained using a training data set labeled, in part, using a generative model conditioned on label attribute information in combination with a directed relation graph having a plurality of nodes in which each node without images at training time has predefined probability distributions.

9. The system of claim 8, wherein the machine learning model is a logistic regression model, a support vector machine, a neural network, or a decision tree.

10. The system of claim 8, wherein the generative model is a variational autoencoder (VAE).

11. The system of claim 10, wherein the VAE is a cross-alignment and distribution-alignment VAE (CADA-VAE).

12. The system of claim 11, wherein the predefined probability distributions are Gaussian distributions.

13. The system of claim 12, wherein an attribute encoder encodes attributes from unseen classes during training.

14. The system of claim 8, wherein providing the data characterizing the classification comprises: causing the classification to be displayed in a graphical user interface of an electronic visual display, transmitting the classification over a network to a remote computing system, storing the classification in physical persistence, or loading the classification into memory.

15. A method for implementation by one or more computing devices comprising:
- labeling training data using a generative model conditioned on label attribute information in combination with a directed relation graph having a plurality of nodes in which each node without images at training time has predefined probability distributions;
- training a machine learning model using the training data;
- receiving an image for classification;
- extracting features from the image;
- classifying, using the extracted features by the machine learning model, the image; and
- providing data characterizing the classification.

16. The method of claim 15, wherein the machine learning model is a logistic regression model, a support vector machine, a neural network, or a decision tree.

17. The method of claim 16, wherein the generative model is a variational autoencoder (VAE).

18. The method of claim 17, wherein the VAE is a cross-alignment and distribution-alignment VAE (CADA-VAE).

19. The method of claim 18, wherein the predefined probability distributions are Gaussian distributions.

20. The method of claim 19, wherein an attribute encoder encodes attributes from unseen classes during training.

\* \* \* \* \*